(12) United States Patent
Hayakawa et al.

(10) Patent No.: US 9,490,715 B2
(45) Date of Patent: Nov. 8, 2016

(54) SWITCHED-MODE POWER SUPPLY DEVICE

(71) Applicant: Sanken Electric Co., Ltd., Niiza-Shi, Saitama (JP)

(72) Inventors: Akira Hayakawa, Fujimino (JP); Masaaki Shimada, Fujimi (JP)

(73) Assignee: SANKEN ELECTRIC CO., LTD., Niiza-shi (JP)

( * ) Notice: Subject to any disclaimer, the term of this patent is extended or adjusted under 35 U.S.C. 154(b) by 0 days.

(21) Appl. No.: 14/828,701

(22) Filed: Aug. 18, 2015

(65) Prior Publication Data

US 2016/0226383 A1    Aug. 4, 2016

(30) Foreign Application Priority Data

Jan. 30, 2015    (JP) .................................. 2015-016247

(51) Int. Cl.
    *H02M 3/335* (2006.01)
    *H02M 1/00* (2006.01)

(52) U.S. Cl.
    CPC ......... *H02M 3/33523* (2013.01); *H02M 3/335* (2013.01); *H02M 2001/0032* (2013.01); *H02M 2001/0054* (2013.01)

(58) Field of Classification Search
    CPC .......... H02M 3/335; H02M 3/33507; H02M 3/33515; H02M 3/33523; H02M 3/33538; H02M 3/33546; H02M 2001/0054
    USPC ....... 363/16, 21.01, 21.12, 21.15, 21.18, 34, 363/124; 323/235, 282, 284
    See application file for complete search history.

(56) References Cited

U.S. PATENT DOCUMENTS

| | | | | | |
|---|---|---|---|---|---|
| 5,903,452 | A | * | 5/1999 | Yang | H02M 3/33507 363/131 |
| 6,583,994 | B2 | * | 6/2003 | Clayton | H02M 1/44 363/131 |
| 7,859,864 | B2 | * | 12/2010 | Shiroyama | H02M 3/33507 363/21.01 |
| 8,737,099 | B2 | * | 5/2014 | Lipcsei | H02M 1/40 323/222 |
| 8,780,590 | B2 | * | 7/2014 | So | H02M 3/33507 363/21.16 |
| 2014/0328090 | A1 | * | 11/2014 | Takahashi | H02M 3/33507 363/21.17 |

FOREIGN PATENT DOCUMENTS

JP    2008-092794 A    4/2008

* cited by examiner

*Primary Examiner* — Timothy J Dole
*Assistant Examiner* — Shahzeb K Ahmad
(74) *Attorney, Agent, or Firm* — Mots Law, PLLC (57) ABSTRACT

A transformer comprises a primary winding to which a DC voltage is applied and a secondary winding. A switching circuit is connected to the primary winding. A rectifying-smoothening circuit rectifies and smoothens a pulse voltage generated at the secondary winding, by switching the switching element. An output unit outputs an output voltage obtained by the rectifying-smoothening circuit to a load. An error amplifier outputs an error voltage between the output voltage and a reference voltage to a primary side as a feedback signal. an oscillator lowers a switching frequency of the switching element in accordance with the feedback signal during a light load state. A frequency correction circuit corrects the switching frequency by the oscillator by changing a frequency correction rate in accordance with a value of the feedback signal along an approximate line along which the transformer is not saturated.

10 Claims, 8 Drawing Sheets

SWITCHED-MODE POWER SUPPLY DEVICE

CROSS REFERENCE TO RELATED APPLICATIONS

This application claims priority based on 35 USC 119 from prior Japanese Patent Application No. 2015-016247 filed on Jan. 30, 2015, entitled "SWITCHED-MODE POWER SUPPLY DEVICE", the entire contents of which are hereby incorporated by reference.

BACKGROUND

This disclosure relates to a switched-mode power supply device.

A switched-mode power supply device described, for example, in Japanese Patent Application Publication No. 2008-92794 (Patent Literature 1) is known as a switched-mode power supply device of prior art. The switched-mode power supply device described in Patent Literature 1 has first to third duty cycle control modes, and a control circuit enters the first duty cycle control mode (heavy load mode) when the value of a feedback signal is IC1. In the first duty cycle control mode, the switching frequency is adjusted to a 100% value on average. When the value of the feedback signal is IC2 (greater than IC1), the control circuit shifts from the first duty cycle control mode to the second duty cycle control mode (light load mode; green mode).

In the second duty cycle control mode, the control circuit adjusts a peak switch current to a fixed value and adjusts the switching frequency to below 100% when the feedback signal increases. The switching frequency reaches a threshold value, which is 20% of the 100% value when the value of the feedback signal reaches IC3 (greater than IC2). When the value of the feedback value is IC3 (greater than IC2), the control circuit shifts from the second duty cycle control mode to the third duty cycle control mode.

With the first and second duty cycle control modes, the drain of the switching element can be suppressed.

However, in the entire first duty cycle control mode and part of the second duty cycle control mode, the switching frequency is high and therefore the switching loss of the switching element is large. For this reason, it has been difficult to further make the switching frequency higher.

Figure 9:
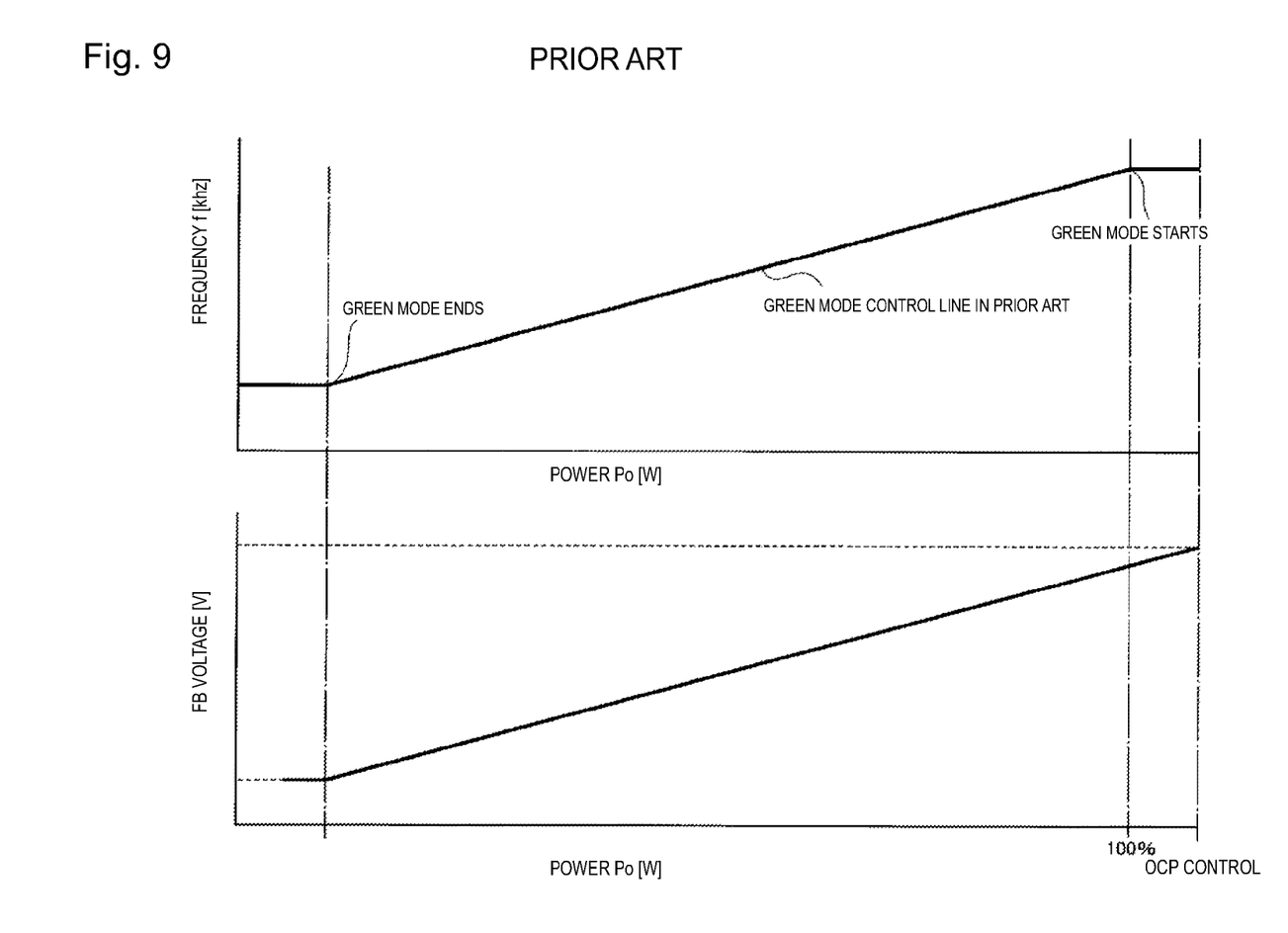
FIG. 9 is a set of graphs for explaining control performed by a prior-art switched-mode power supply device during a green mode.

Also, as illustrated in FIG. 9, in the prior-art switched-mode power supply device, feedback voltage FB linearly decreases with decrease in load power P0 (load ratio). For this reason, the switching frequency line linearly decreases with decrease in load power P0 (load ratio) also during a light load state. With this straight switching frequency line, the frequency is high and the switching loss therefore increases during a moderate load state. Accordingly, the efficiency is lowered.

Also, there has been a demand to further make the switching frequency higher to downsize a transformer. However, if the switching frequency is further made higher, the switching loss lowers the efficiency during a heavy to moderate load state.

SUMMARY

An embodiment of a switched-mode power supply device comprises a transformer comprising a primary winding to which a DC voltage is applied and a secondary winding; a switching circuit connected to the primary winding; a rectifying-smoothening circuit that rectifies and smoothens a pulse voltage generated at the secondary winding, by switching the switching element; an output unit that outputs an output voltage obtained by the rectifying-smoothening circuit to a load; an error amplifier that outputs an error voltage between the output voltage and a reference voltage to a primary side as a feedback signal; an oscillator that lowers a switching frequency of the switching element in accordance with the feedback signal during a light load state; and a frequency correction circuit that corrects the switching frequency by the oscillator by changing a frequency correction rate in accordance with a value of the feedback signal along an approximate line along which the transformer is not saturated.

DETAILED DESCRIPTION

Figure 1:
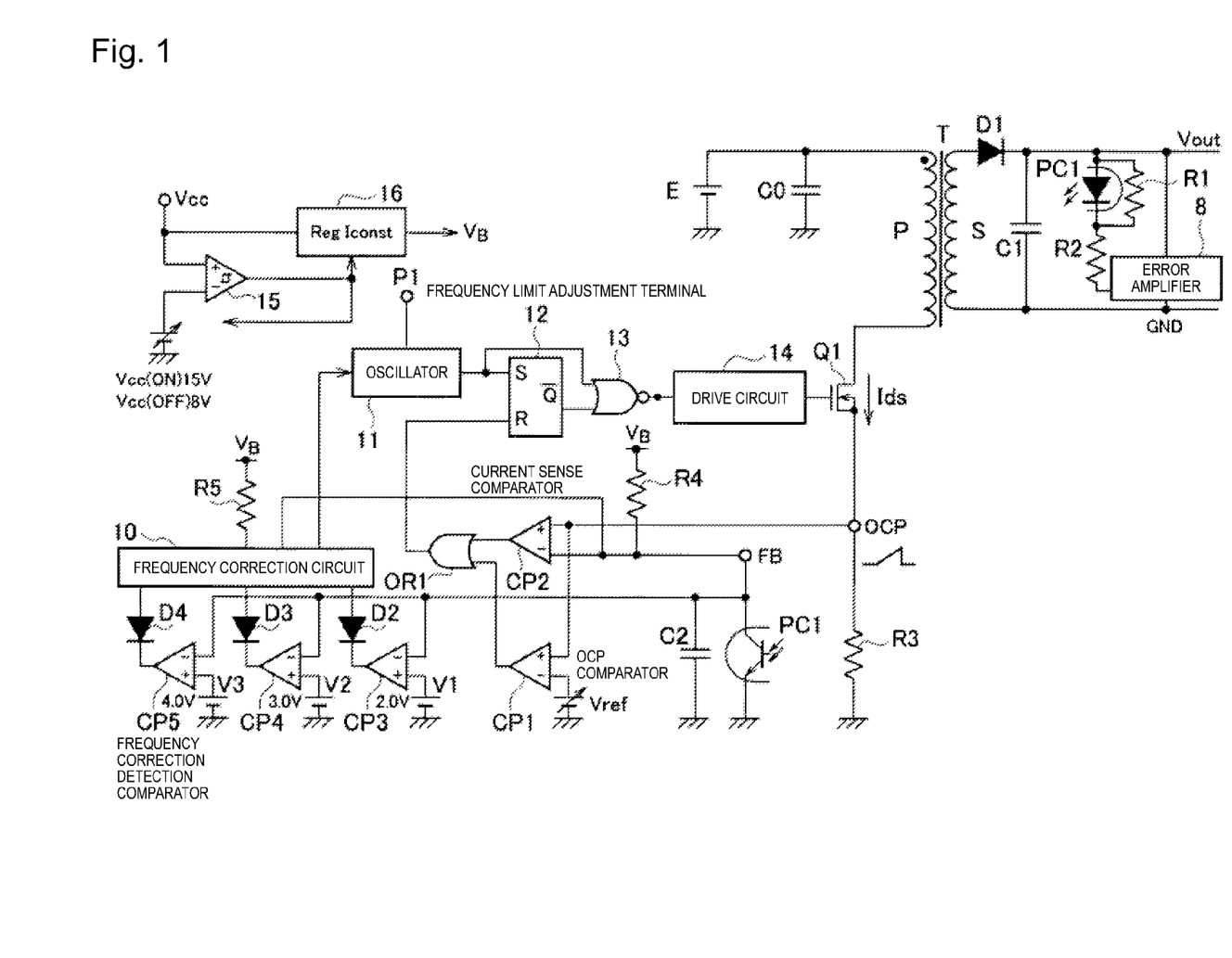
FIG. 1 is a block diagram illustrating a switched-mode power supply device according to Embodiment 1.

Embodiments are now described in detail with reference to the drawings. FIG. 1 is a diagram illustrating the circuit configuration of a switched-mode power supply device according to Embodiment 1. The switched-mode power supply device of Embodiment 1 applies a DC voltage of smoothening capacitor CO to primary winding P of transformer T and switch on and off switching element Q1 connected to one end of primary winding P, to rectify and smoothen a pulse voltage generated at secondary winding S of transformer T with a rectifying-smoothening circuit formed by diode D1 and output capacitor C1, and output voltage Vout thus obtained to a load not illustrated.

Note that, though not illustrated, the DC voltage of DC power supply E may be a voltage obtained by rectifying an input voltage from an AC power supply with a diode.

Error amplifier 8 is connected to both ends of output capacitor C1. A series circuit formed by the photodiode of photocoupler PC1 and resistor R2 is connected between one end of output capacitor C1 and error amplifier 8. Resistor R1 is connected to both ends of the photodiode.

Error amplifier 8 outputs the error voltage between the output voltage of output capacitor C1 and a reference voltage through the photodiode of photocoupler PC1 to the phototransistor of photocoupler PC1 on the primary side as a feedback signal. Feedback terminal FB outputs feedback voltage FB is provided at the collector of the phototransistor of photocoupler PC1.

Switching element Q1 includes a MOSFET, and is connected at its drain to the one end of primary winding P and at its source to one end of resistor R3. The other end of resistor R3 is grounded.

Overcurrent protection terminal OCP is provided at the one end of resistor R3. OCP comparator CP1 outputs an H-level signal to OR circuit OR1 when the voltage from overcurrent protection terminal OCP is equal to or higher than reference voltage Vref, and output an L-level signal to OR circuit OR1 when the voltage from overcurrent protection terminal OCP is lower than reference voltage Vref.

OR circuit OR1 outputs its output, e.g. an H-level signal to the reset terminal of flipflop circuit 12. Flipflop circuit 12 is outputs an H-level signal to NOR circuit 13 from inverting inverted-output terminal Qb in response to the output from OR circuit OR1, e.g. the H-level signal.

NOR circuit 13 is switches off switching element Q1 by outputting an L-level signal to the gate of switching element Q1 through drive circuit 14. In other words, in a case where an overcurrent flows in switching element Q1, switching element Q1 is switched off so that it can be protected from the overcurrent.

Current sense comparator CP2 outputs an H-level signal to OR circuit OR1 when the voltage from overcurrent protection terminal OCP is equal to or higher than feedback voltage FB, and output an L-level signal to OR circuit OR1 when the voltage from overcurrent protection terminal OCP is lower than feedback voltage FB. The process from OR circuit OR1 through flipflop circuit 12 to NOR circuit 13 is the same as the process with OCP comparator CP1, and description thereof is therefore omitted.

The configuration of the switched-mode power supply device of Embodiment 1 is described further. Capacitor C2 is connected between feedback terminal FB and the ground. Capacitor C2 is connected to oscillator 11 through frequency correction detection comparators CP3 to CP5 and frequency correction circuit 10.

Though not illustrated, oscillator 11 includes a capacitor and a switch therein. Oscillator 11 charges the capacitor with current from frequency correction circuit 10, and discharges the charge of the capacitor by using the switch when the charge voltage of the capacitor reaches a predetermined voltage. The switching frequency is set based on this charge-discharge cycle. Oscillator 11 is lowers the switching frequency of switching element Q1 in accordance with feedback voltage FB (the voltage of capacitor C2) during a light load state.

Frequency correction detection comparators CP3 to CP5 and frequency correction circuit 10 corrects the switching frequency by oscillator 11 by changing a frequency correction rate in accordance with the value of feedback voltage FB (the voltage of capacitor C2) along an approximate line along which transformer T is not saturated.

Frequency correction detection comparators CP3 to CP5 and frequency correction circuit 10 changes the frequency correction rate for the switching frequency which has been lowered by oscillator 11, to thereby further lower the switching frequency.

When feedback voltage FB at capacitor C2 is equal to or higher than reference voltage V1 (e.g. 2 V), the output of frequency correction detection comparator CP3 is at L level and it therefore draws current from frequency correction circuit 10 through diode D2.

When feedback voltage FB at capacitor C2 is equal to or higher than reference voltage V2 (e.g. 3 V), which is higher than reference voltage V1, the output of frequency correction detection comparator CP4 is at L level and it therefore draws current from frequency correction circuit 10 through diode D3.

When feedback voltage FB at capacitor C2 is equal to or higher than reference voltage V3 (e.g. 4 V), which is higher than reference voltage V2, the output of frequency correction detection comparator CP5 is at L level and it therefore draw current from frequency correction circuit 10 through diode D4.

Figure 2:
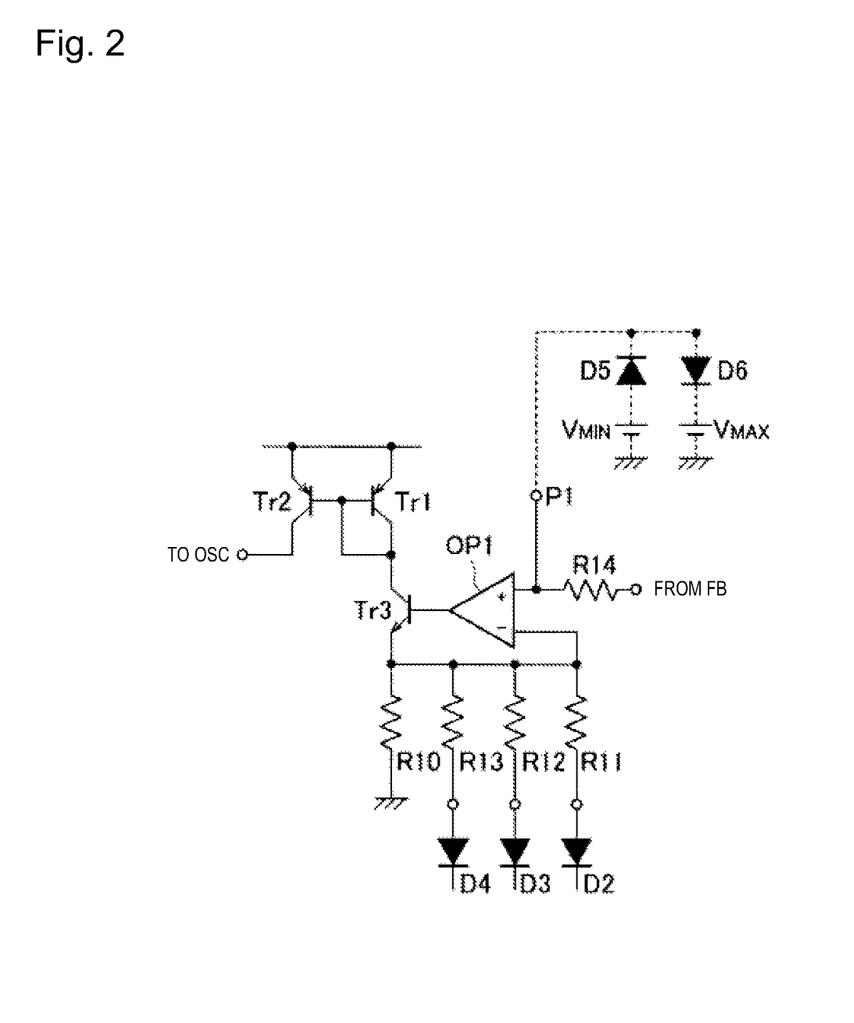
FIG. 2 is a diagram illustrating details of the circuit configuration of a frequency correction circuit provided in the switched-mode power supply device according to Embodiment 1.

FIG. 2 is a diagram illustrating details of the circuit configuration of the frequency correction circuit provided in the switched-mode power supply device according to Embodiment 1. The frequency correction circuit is a circuit converts voltage into current and includes transistors Tr1, Tr2, Tr3, resistors R10 to R13, and operational amplifier OP1.

One end of resistor R11 is connected the anode of diode D2, one end of resistor R12 is connected to the anode of diode D3, and one end of resistor R13 is connected to the anode of diode D4.

The other end of resistor R11, the other end of resistor R12, and the other end of resistor R13 are each connected to the inverting terminal of operational amplifier OP1, one end of resistor R10, and the emitter of transistor Tr3. The other end of resistor R10 is grounded.

Operational amplifier OP1 amplifies the differential voltage between feedback voltage FB and the voltage at resistor R10 and outputs the differential voltage to the base of transistor Tr3. The emitter of transistor Tr1 and the emitter of transistor Tr2 are connected to a power supply not illustrated. The base and collector of transistor Tr1 and the base of transistor Tr2 are connected to the collector of transistor Tr3. The collector of transistor Tr2 is connected to oscillator 11 and supplies current to the capacitor of oscillator 11 not illustrated.

Reference voltages V1 to V3 for frequency correction detection comparators CP3 to CP5 and resistors R11 to R13 of frequency correction circuit 10 change the frequency correction rate for the switching frequency lowered by oscillator 11.

Moreover, the switched-mode power supply device of Embodiment 1 has improved the efficiency during a heavy load state by performing high frequency control in a peak load state. Here, the peak load is a load greater than a base load (a load with small variations that is applied continuously) and applied continuously for a predetermined period of time.

Next, the operation of the switched-mode power supply device of Embodiment 1 configured as above is described.

In the switched-mode power supply device of Embodiment 1, during a green mode, frequency correction detection comparators CP3 to CP5 and frequency correction circuit 10 correct the switching frequency by oscillator 11 by changing the frequency correction rate in accordance with the value of feedback voltage FB (the voltage of capacitor C2) along which transformer T is not saturated.

The operation of frequency correction detection comparators CP3 to CP5 and frequency correction circuit 10 is described below.

First, in a range illustrated in FIG. 3 where the load ratio is below 40%-50%, feedback voltage FB, i.e. the voltage of capacitor C2 is not above reference voltage V1. Thus, the outputs of frequency correction detection comparators CP3 to CP5 are at H level, and frequency correction detection comparators CP3 to CP5 do not at all act on frequency correction circuit 10. Operational amplifier OP1 of frequency correction circuit 10 causes a significantly low current to flow through transistor Tr3 such that the same voltage as the voltage at the non-inverting terminal (the voltage of capacitor C2) is generated at the inverting terminal. As a result, the significantly low current flowing through transistor Tr3 flows into transistor Tr2 through transistor Tr1 and charges the capacitor of oscillator 11. Here, since the current that flows into the capacitor of oscillator 11 is significantly low, the oscillation frequency shifts to a low frequency.

Figure 3:
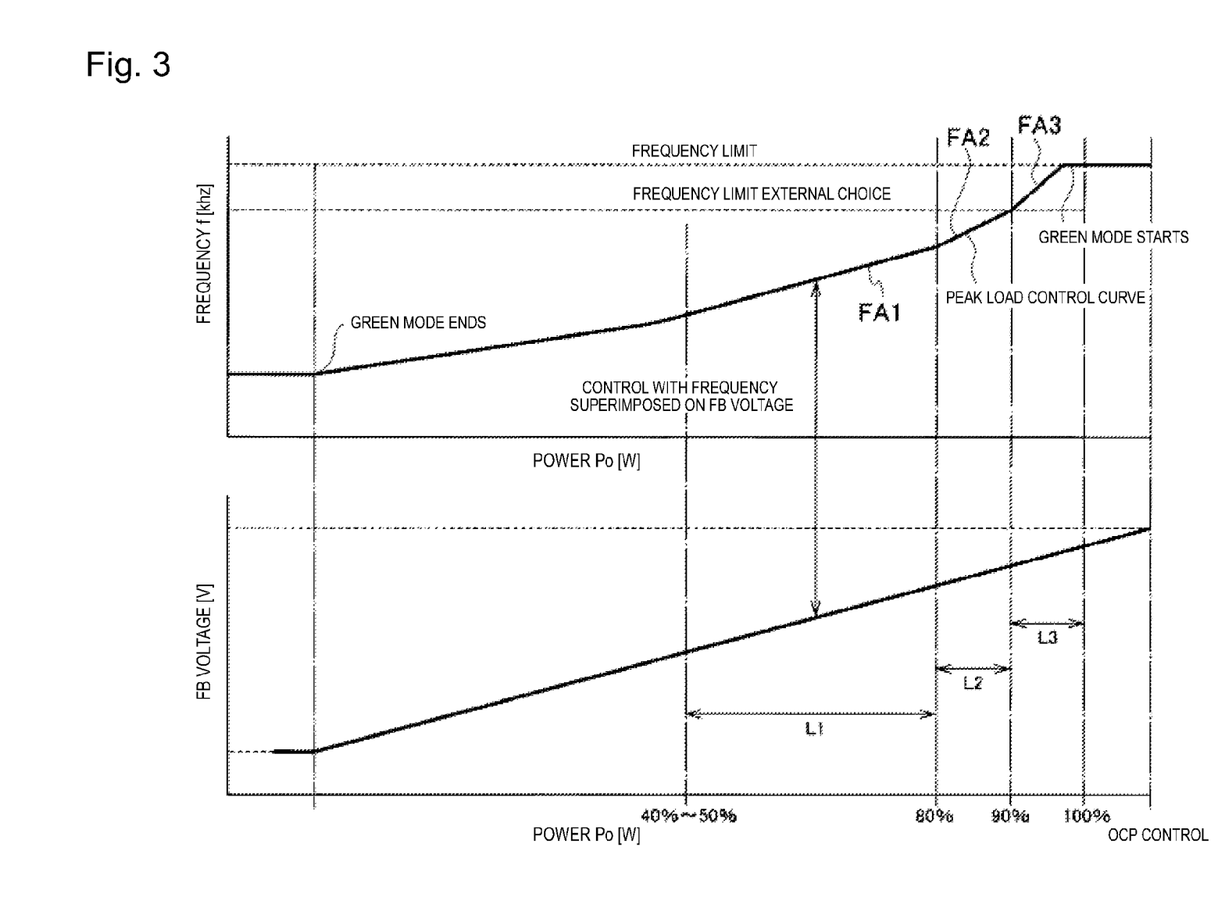
FIG. 3 is a set of graphs for explaining control for making the switching frequency higher (hereinafter, referred to as "higher frequency control") performed by the switched-mode power supply device according to Embodiment 1 during a green mode.

Next, in a range L1 illustrated in FIG. 3 where the load ratio is from 40%-50% to 80%, feedback voltage FB, i.e. the voltage of capacitor C2 is above reference voltage V1 (2 V). Thus, the output of frequency correction detection comparator CP3 is at L level, and frequency correction detection comparator CP3 therefore draws current from frequency correction circuit 10 through diode D2. This means that the output of frequency correction detection comparator CP3 is grounded. As a result, resistor R11 is connected in parallel to resistor R10.

Here, as feedback voltage FB, a voltage slightly higher than reference voltage V1 (2 V), e.g. 2.1 V is applied, and the same voltage must be applied to the inverting terminal of operational amplifier OP1. For this reason, operational amplifier OP1 amplifies the error voltage between feedback voltage FB and, e.g. 2.1 V and applies it to the base of transistor Tr3. Then, the current that flows through resistor R10 and, in addition, the current that flows through resistor R11 corresponding to the increase flow into transistor Tr3. Thus, a low current from resistor R10 and resistor R11 flows into transistor Tr2 through transistor Tr1 and then into the capacitor of oscillator 11. As a result, the switching frequency changes at frequency correction rate FA1 with the charge and discharge of the capacitor of oscillator 11.

Next, in a range L2 where the load ratio is from 80% to 90%, feedback voltage FB, i.e. the voltage of capacitor C2 is above reference voltages V1, V2. Thus, the outputs of frequency correction detection comparators CP3, CP4 are at L level, and frequency correction detection comparators CP3, CP4 therefore draw current from frequency correction circuit 10 through diodes D2, D3. This means that the outputs of frequency correction detection comparators CP3, CP4 are grounded. As a result, resistor R10 and resistors R11, R12 are connected to the inverting terminal of operational amplifier OP1 as a combined resistor. Then, operational amplifier OP1 amplifies the error voltage between feedback voltage FB, e.g. 3.1 V and the voltage at the inverting terminal of operational amplifier OP1 and applies it to the base of transistor Tr3. Thus, a moderate current flows through transistor Tr3, and the moderate current that flows into transistor Tr2 through transistor Tr1 flows then into the capacitor of oscillator 11. As a result, the switching frequency changes at frequency correction rate FA2, which is greater in gradient than frequency correction rate FA1, with the charge and discharge of the capacitor of oscillator 11.

Next, in a range L3 where the load ratio is from 90% to 100%, feedback voltage FB, i.e. the voltage of capacitor C2 is above reference voltages V1, V2, V3. Thus, the outputs of frequency correction detection comparators CP3, CP4, CP5 are at L level, and frequency correction detection comparators CP3, CP4, CP5 therefore draw current from frequency correction circuit 10 through diodes D2, D3, D4. This means that the outputs of frequency correction detection comparators CP3, CP4, CP5 are grounded. As a result, resistor R10, and resistors R11, R12, R13 are connected to the inverting terminal of operational amplifier OP1 as a combined resistor. Then, operational amplifier OP1 amplifies the error voltage between feedback voltage FB and, e.g. 4.1 V and applies it to the base of transistor Tr3. Thus, a high current corresponding to the current flowing through the combined resistor, which is formed by resistors R10 to R12, flows through transistor Tr3, and the high current that flows into transistor Tr2 through transistor Tr1 flows then into the capacitor of oscillator 11. As a result, the switching frequency changes at frequency correction rate FA3 that is greater in gradient than frequency correction rate FA2, with the charge and discharge of the capacitor of oscillator 11.

As described above, in the switched-mode power supply device of Embodiment 1, frequency correction circuit 10 and frequency correction detection comparators CP3 to CP5 correct the switching frequency by oscillator 11 by changing the frequency correction rate in accordance with the value of the feedback signal along an approximate line along which transformer T is not saturated. Hence, the switching frequency can further be made higher. In this way, it is possible to provide a switched-mode power supply device in which its transformer can be downsized and the efficiency can be enhanced during a heavy load state.

Also, unlike a straight switching frequency line in a green mode in prior art illustrated in FIG. 9, the frequency correction rate is changed as illustrated in FIG. 3 by using frequency correction detection comparators CP3 to CP5 and frequency correction circuit 10. In this way, the switching frequency is further lowered. Specifically, since the frequency is lowered during a moderate load state, the switching loss can be reduced and the efficiency can therefore be enhanced.

Figure 4A:
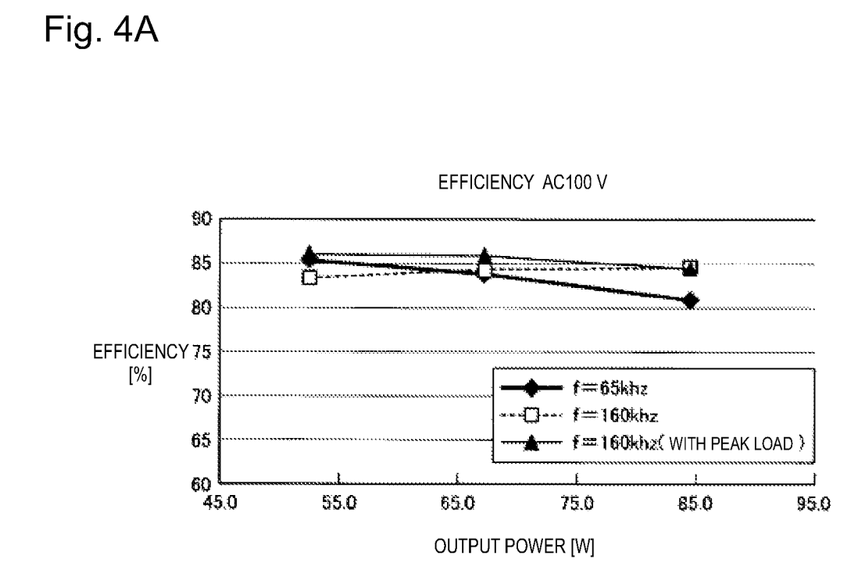
FIGS. 4A and 4B are graphs illustrating the relationship between output power and efficiency in a case where high frequency control is performed with normal control by the switched-mode power supply device according to Embodiment 1.
Figure 4B:
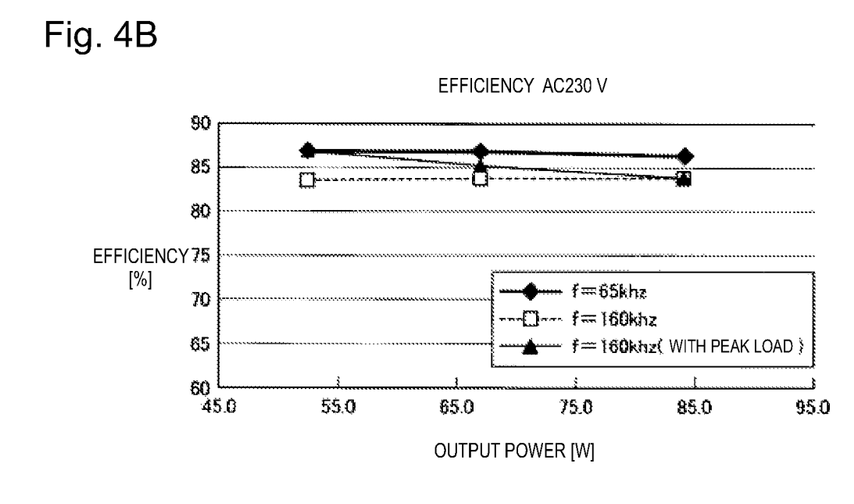

Also, the switched-mode power supply device of Embodiment 1 performs the high frequency control during a peak load state. In this way, it is possible to reduce the maximum value of the switching current and improve the efficiency during a heavy load state. FIGS. 4A and 4B are graphs illustrating the relationship between the output power and the efficiency in a case where the high frequency control is performed with normal control by the switched-mode power supply device according to Embodiment 1. FIGS. 4A and 4B illustrate the efficiency versus the output power in each of situations where switching frequency f is 65 kHz, 160 kHz, and 160 kHz (with the peak load measure), FIG. 4A being an instance where the AC voltage is 100 V, and FIG. 4B being an instance where the AC voltage is 230 V.

In the instance illustrated in FIG. 4A where the AC voltage is 100 V, when switching frequency f is 160 kHz (frequency that has been made higher), the ON resistance loss decreases, thereby improving the efficiency. However, in the instance illustrated in FIG. 4B where the AC voltage is 230 V, when switching frequency f is 160 kHz, the switching loss increases, thereby lowering the efficiency during a moderate load state.

In contrast, when switching frequency f is, for example, at 160 kHz with the peak-load frequency control (with the peak load measure in FIGS. 4A and 4B), it is possible to improve the efficiencies of the 100-V AC-voltage system and the 200-V AC-voltage system during a heavy load state and a moderate load state.

Figure 5:
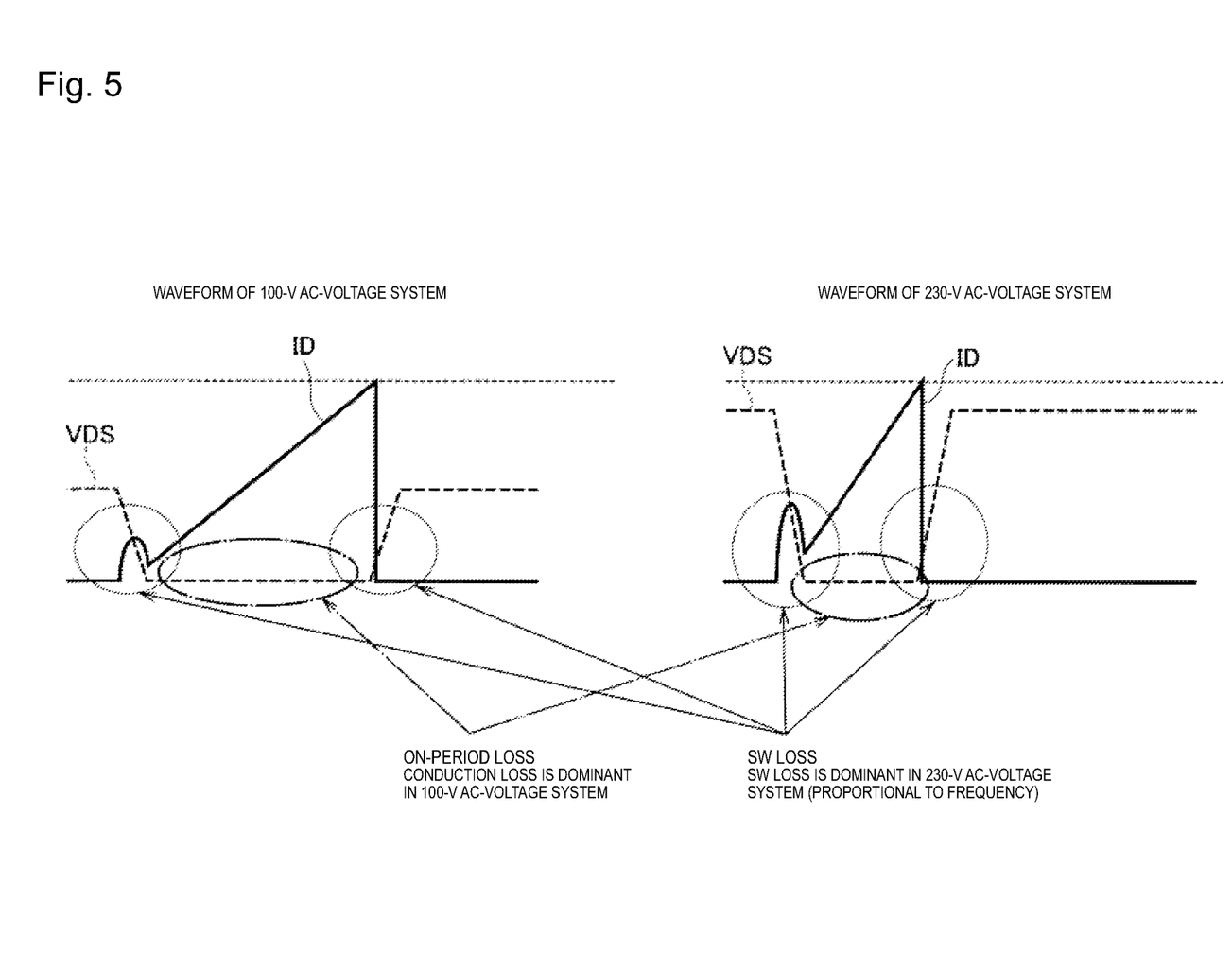
FIG. 5 is a diagram for explaining waveform loss in the switched-mode power supply device according to Embodiment 1.

FIG. 5 is a diagram for explaining waveform loss in the switched-mode power supply device according to Embodiment 1. FIG. 5 illustrates the waveforms of the 100-V AC-voltage system and the waveforms of the 230-V AC-voltage system. Note that VDS denotes the voltage between the drain and source of switching element Q1, and ID denotes the current flowing between the source and drain of switching element Q1.

In the waveforms of the 100-V AC-voltage system in FIG. 5, the conduction loss of switching element Q1 during its ON period is dominant. In the waveforms of the 230-V AC-voltage system in FIG. 5, the switching loss of switching element Q1 is dominant.

Meanwhile, the switched-mode power supply device of Embodiment 1 includes frequency limit adjustment terminal P1 connected to oscillator 11. This frequency limit adjustment terminal P1 is a terminal adjusts the upper limit frequency and lower limit frequency of oscillator 11. The upper limit frequency and lower limit frequency, which are the frequency limits of oscillator 11, can be adjusted from frequency limit adjustment terminal P1 that is provided externally.

FIG. 2 exemplarily illustrates the connection between diode D6 and reference voltage VMAX for setting the upper limit frequency, and the connection between diode D5 and reference voltage VMIN for setting the lower limit frequency. For example, by setting reference voltage VMIN to 1 V and setting reference voltage VMAX to 5 V, the lower and upper limit values of the voltage at the non-inverting terminal of operational amplifier OP1, to which feedback voltage FB is inputted, are limited, and the frequency limits can therefore be adjusted.

Embodiment 2

Figure 6:
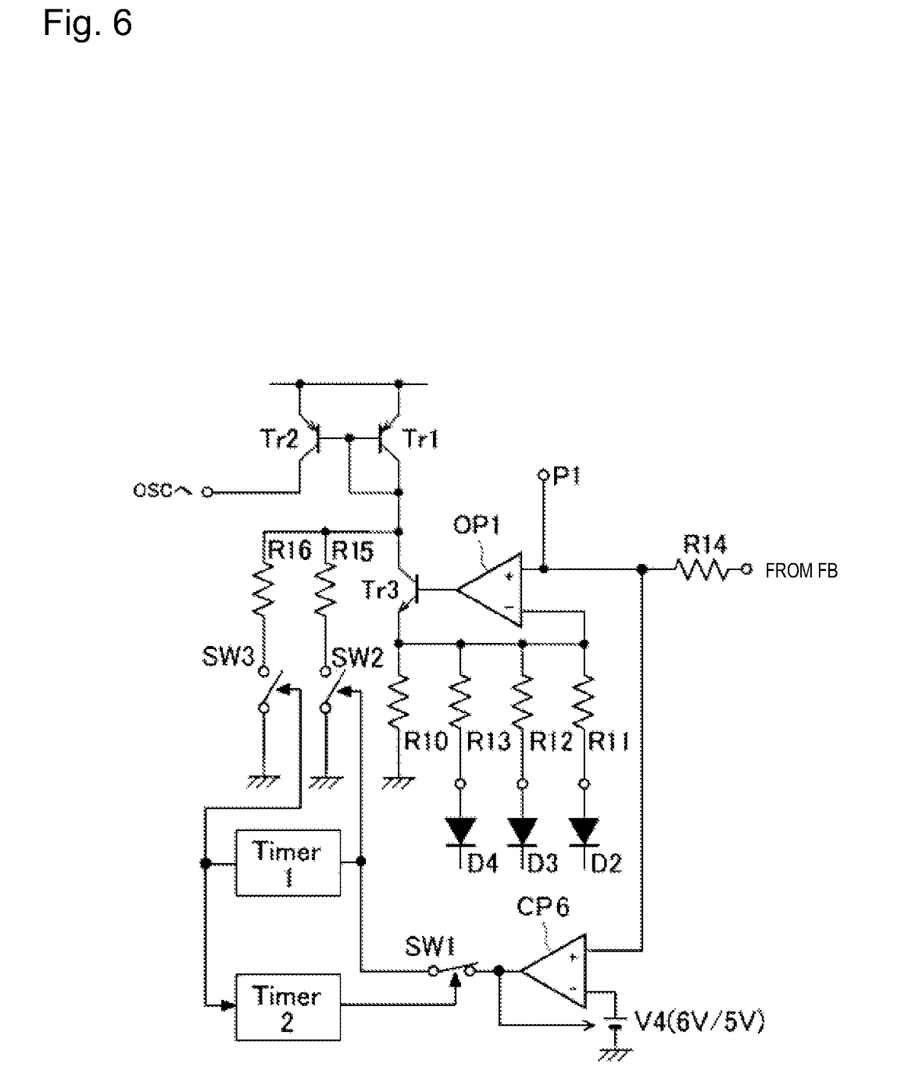
FIG. 6 is a block diagram illustrating a switched-mode power supply device according to Embodiment 2.

FIG. 6 is a diagram illustrating the circuit configuration of a frequency correction circuit provided in a switched-mode power supply device according to Embodiment 2. The frequency correction circuit is a circuit converts voltage into current and includes switches SW1 to SW3, resistors R15, R16, comparator CP6, and timers Timer1, Timer2, in addition to the components of the frequency correction circuit of Embodiment 1.

Resistors R15, R16 are connected at one end to the base and collector terminals of transistor Tr1 and at the other end to GND through switches SW2, SW3, respectively. With switches SW2, SW3 on, the upper limit oscillation frequency of the oscillator of Embodiment 1 can be raised further by 10% to 20%.

Here, feedback voltage FB is connected through resistor R14 to the non-inverting terminal of comparator CP6, and reference voltage V4 (which is 6 V in the initial state and is shifted to 5 V when the output of comparator CP6 shifts to H level) is connected to the inverting terminal of the comparator CP6. The output terminal of comparator CP6 is connected through switch SW1 to the input terminal of timer Timer1 and the ON-OFF terminal of switch SW2. Switch SW2 is on when the output of comparator CP6 is at H level. The output terminal of timer Timer1 is connected to the ON-OFF terminal of switch SW3 and the input terminal of timer Timer2. Switch SW3 is on when the output of timer Timer1 is at H level. The output terminal of timer Timer2 is connected to the ON-OFF terminal of switch SW1.

Specifically, the upper limit oscillation frequency of the oscillator of Embodiment 1 is raised further by 10% for a first predetermined period of time counted by timer Timer1. Once timer Timer1 finishes counting up, it outputs an H-level signal, so that the upper limit oscillation frequency of the oscillator of Embodiment 1 is raised further by 20% and, at the same time, timer Timer2 starts counting. Switch SW1 is switched off after the elapse of a second predetermined period of time. As a result, the upper limit oscillation frequency of the oscillator is set back to that in Embodiment 1.

Note that, though not illustrated, the frequency correction circuit may further include timer Timer3. In this case, the output of timer Timer2 may be connected to the input terminal of timer Timer3, and the count of each of timer Timer1 and timer Timer2 may be reset using the output of timer Timer3. In this way, after the upper limit oscillation frequency of the oscillator is raised by 20% as described above, timer Timer3 can prohibit repeating of the operation for a predetermined period of time.

By employing the control for higher frequency to handle a peak load caused by a motor or the like, the frequency correction circuit of Embodiment 2 is capable of responding to a peak load, or a motor load, which requires a large current for a short period of time. Being capable of supplying power to such a peak load for a short period of time eliminates the need for measures such as increasing the size of the transformer and increasing the capacitance of the output capacitor. Hence, the power supply can be downsized as a whole.

Figure 7:
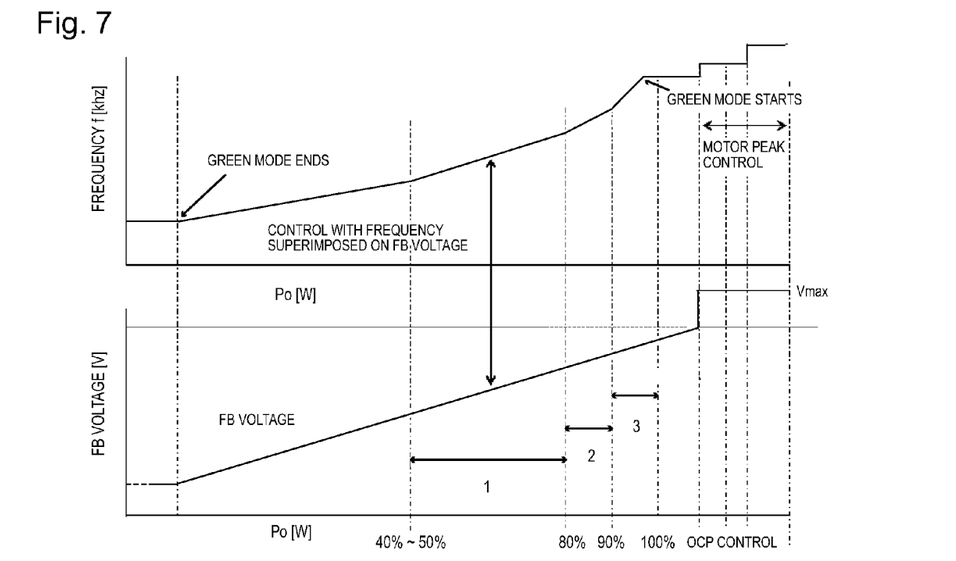
FIG. 7 is a set of graphs for explaining higher frequency control performed by a switched-mode power supply device according to Embodiment 2 in a green mode.

FIG. 7 is a set of graphs for explaining higher frequency control performed by the switched-mode power supply device according to Embodiment 2 during a green mode. Assume a characteristic in which the oscillation frequency is linearly raised in accordance with the load as an extension of a characteristic (green mode characteristic) in which the oscillation frequency is changed in accordance with the frequency load current. In this characteristic, the oscillation frequency in an excess load range beyond a 100% load range may possibly be fixed at a high frequency in synchronization with a peak load current for a motor or the like.

A peak load by a motor or the like is handled by providing predetermined time limits in the load range of that peak load and raising the oscillation frequency stepwisely therein. Specifically, when the excess load range beyond the 100% load range is reached, feedback voltage FB passes the voltage-controllable range and rises to voltage Vmax that is unique to the control circuit. Upon detection of feedback voltage FB (in the range at and after OCP control in FIG. 7) reaching voltage Vmax, which is unique to the control circuit, the oscillation frequency is raised by one level (e.g. by 10%). By raising the oscillation frequency on condition that feedback voltage FB remains unchanged, the power can be increased by the amount by which the frequency is raised. In other words, raising the frequency shortens the switching cycle and thereby increases the amount of DC superimposition of the switching current. This increases the effective current value of the switching current and increases the power to be stored in primary winding P of transformer T. Accordingly, the power to be supplied to the load is increased.

Figure 8:
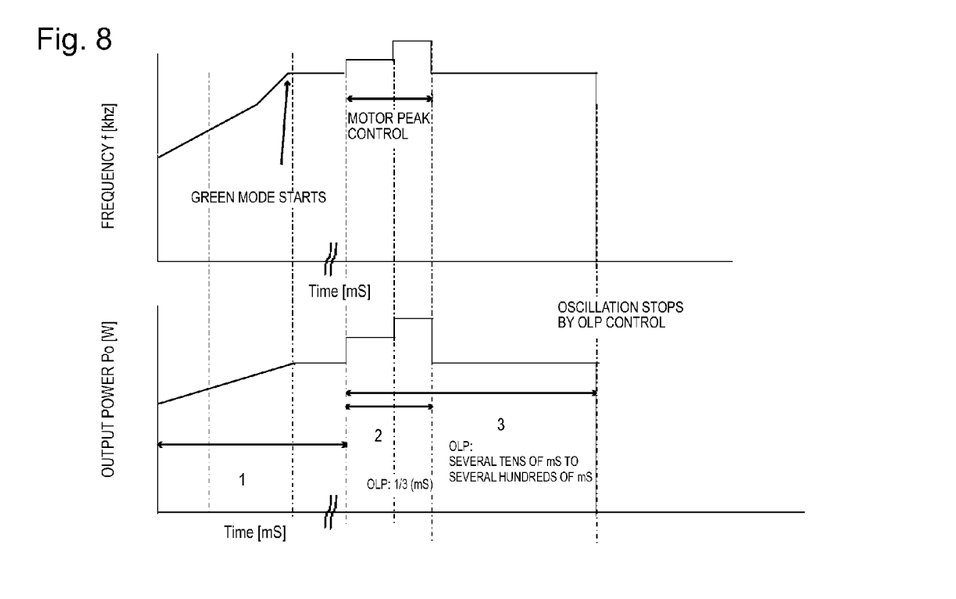
FIG. 8 is a set of graphs for explaining the higher frequency control performed by a switched-mode power supply device according to Embodiment 2 in the green mode.

FIG. 8 is a set of graphs for explaining the higher frequency control performed by the switched-mode power supply device according to Embodiment 2 during the green mode. The oscillation frequency is raised by two levels (e.g. by 20%) from the frequency in the 100% load range in a case where feedback voltage FB does not drop from voltage Vmax, which is unique to the control circuit, to the voltage-controllable range even when a predetermined period of time elapses after the above-mentioned state is reached. In this way, the power can be increased by the amount by which the frequency is raised (e.g. by 20%), if feedback voltage FB remains unchanged.

Here, in a case where feedback voltage FB does not drop from voltage Max, which is unique to the control circuit, to voltage-controllable range even after a preset period of time elapses, the oscillation frequency is set back to the 100% load range. In this way, the increase in temperature of the switching element can be limited to transitional temperature increase.

Meanwhile, when the power supply is started, the output voltage outputted is not a steady voltage, and the feedback voltage is therefore not in the voltage-controllable range. For this reason, at startup, the oscillation frequency is prohibited from being raised to oscillation frequencies higher than the upper limit frequency (the frequencies higher by 10% and 20% mentioned above).

Note that in a case where a peak load occurs multiple times successively, the time may be measured until feedback voltage FB is released from voltage Vmax, which is unique to the control circuit, to the voltage-controllable range, to prohibit the oscillation frequency from being raised by the one or two levels from the frequency in the 100% load range.

According to the above, the oscillation frequency is controlled at appropriate frequencies in accordance with the motor load (small to large) in a set state. Thus, it is possible to perform appropriate control in accordance with the motor load without delivering power to the secondary side more than necessary. Hence, it is possible to prevent unstable operation in the range between the normal operation range and the motor peak load. Also, by disabling the above-described function during a soft start period at startup, the control can be performed separately for the startup and the motor peak load.

According to the embodiments described above, the frequency correction circuit corrects the switching frequency by the oscillator by changing the frequency correction rate in accordance with the value of the feedback signal along an approximate line along which the transformer is not saturated. Thus, the switching frequency can be made higher in accordance with the load state. In this way, it is possible to provide a switched-mode power supply device in which its transformer can be downsized and the efficiency can be enhanced during a heavy to moderate load state.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A switched-mode power supply device, comprising:
a transformer comprising a primary winding to which a DC voltage is applied and a secondary winding;
a switching circuit connected to the primary winding;
a rectifying-smoothening circuit that rectifies and smoothens a pulse voltage generated at the secondary winding, by switching the switching element;
an output unit that outputs an output voltage obtained by the rectifying-smoothening circuit to a load;
an error amplifier that outputs an error voltage between the output voltage and a reference voltage to a primary side as a feedback signal;
an oscillator that lowers a switching frequency of the switching element in accordance with the feedback signal during a light load state; and
a frequency correction circuit that corrects the switching frequency by the oscillator by changing a frequency correction rate in accordance with a value of the feedback signal along an approximate line along which the transformer is not saturated.

2. The switched-mode power supply device of claim 1, wherein the frequency correction circuit changes the frequency correction rate for the lowered switching frequency to thereby further lower the switching frequency.

3. The switched-mode power supply device of claim 2, wherein the frequency correction circuit increases an amount by which the switching frequency is increased per unit load, as an imposed load increases.

4. The switched-mode power supply device of claim 1, wherein the approximate line includes a plurality of lines, each line has a different gradient from others.

5. The switched-mode power supply device of claim 1, wherein the switching frequency includes an upper limit frequency and a lower limit frequency.

6. The switched-mode power supply device of claim 5, further comprising a frequency adjustment terminal configured to adjust the upper limit frequency and the lower limit frequency by the oscillator.

7. The switched-mode power supply device of claim 5, wherein the frequency correction circuit corrects the switching frequency by the oscillator stepwisely to an oscillation frequency higher than the upper limit frequency, when a predetermined period of time elapses after an excess load state is reached, the excess load state being a state where the output voltage is incapable of being obtained by using the feedback signal from the error amplifier.

8. The switched-mode power supply device of claim 7, wherein, each time the predetermined period of time elapses, the frequency correction circuit shifts the oscillation frequency stepwisely to a higher level from the upper limit frequency and brings the oscillation frequency back to the upper limit frequency after a final frequency is reached.

9. The switched-mode power supply device of claim 7, wherein, when the switched-mode power supply device is started, the frequency correction circuit does not shift the switching frequency to an oscillation frequency higher than the upper limit frequency.

10. The switched-mode power supply device of claim 1, wherein the frequency correction circuit stepwisely increases an amount by which the switching frequency is increased per unit load, as an imposed load increases.

* * * * *